G. BAILLIO.
METHOD OF MAKING ANHYDROUS TIN CHLORID.
APPLICATION FILED JAN. 15, 1906.
1,018,805.
Patented Feb. 27, 1912.
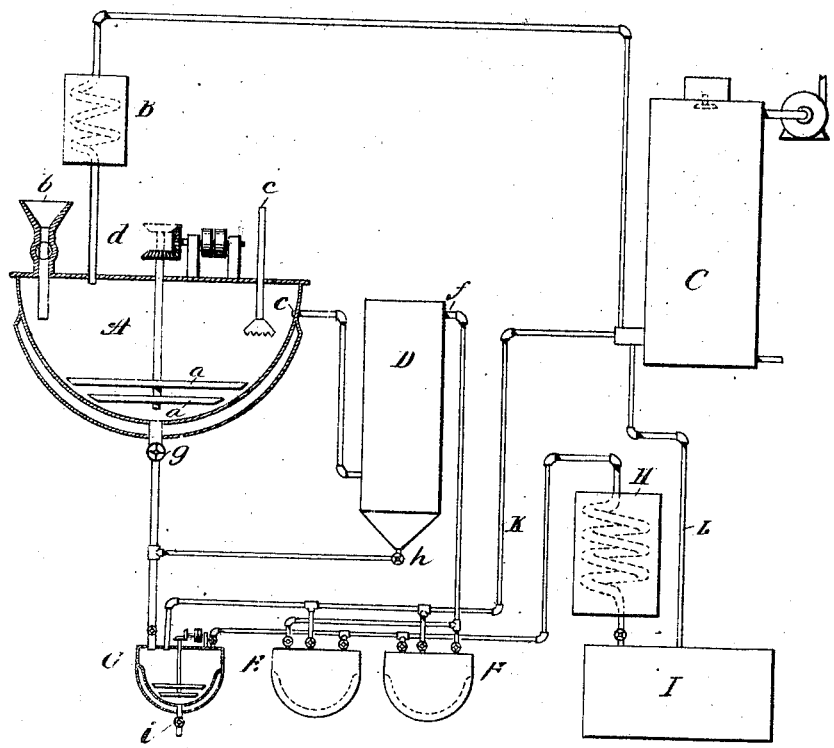

UNITED STATES PATENT OFFICE.

GERVAIS BAILLIO, OF NIAGARA FALLS, NEW YORK, ASSIGNOR TO CASTNER ELECTROLYTIC ALKALI COMPANY, A CORPORATION OF VIRGINIA.

METHOD OF MAKING ANHYDROUS TIN CHLORID.

1,018,805.      Specification of Letters Patent.      Patented Feb. 27, 1912.

Application filed January 15, 1906. Serial No. 296,095.

*To all whom it may concern:*

Be it known that I, GERVAIS BAILLIO, a citizen of the United States, residing at Niagara Falls, in the county of Niagara and State of New York, have invented certain new and useful Improvements in Methods of Making Anhydrous Tin Chlorid, of which the following is a full, clear, and exact description.

The primary object of my invention is to provide a continuous process for converting metallic tin into anhydrous tin bichlorid on a commercial scale.

In manufacturing anhydrous tin bichlorid in the dry way, *i. e.* by passing dry chlorin gas over metallic tin, sufficient heat is developed to melt the tin and in this condition a certain percentage of tin combines with the oxygen of the air, mixed with the chlorin gas, to form stannic oxid, this causing a loss of tin to the manufacturer.

In carrying out my invention, I avoid any oxidation of the metallic tin by submerging the tin in a quantity of anhydrous liquid, so that the tin is completely covered thereby and afterward apply chlorin gas thereto. It is essential to carry out this operation in a water-jacketed kettle or other suitable vessel fitted with steam connections, as it is of primary importance that the temperature be under control. While the tin used may be perfectly pure, it is not necessary that it should be, as very satisfactory results have been obtained from a compound containing about 90% tin, the remaining 10% being composed of lead, iron and other impurities.

Carbon tetra-chlorid or any suitable anhydrous liquid may be employed, as the substance in which the tin is submerged, but I prefer to use anhydrous tin bichlorid for this purpose. The tin bichlorid or the anhydrous liquid in which the tin is submerged serves as a seal to protect the tin from being oxidized by the oxygen of the air mixed with the chlorid gas and also makes it possible to easily control the temperature by agitating the whole mass. It is not essential that the chlorin used be dried prior to its use in the process, for any moisture that may accompany the chlorin is crystallized out on coming in contact with the tin bichlorid. It is essential, however, that the tin be completely submerged in, or covered by the anhydrous liquid employed and while I prefer that the chlorin be introduced below the surface of the liquid, this is not absolutely necessary, for the density of the tin bichlorid is such that when working with finely divided tin which has been found to be the most favorable condition, the tin can easily be kept suspended in the liquid by the use of agitators and the action will take place at the surface of the liquid.

It is necessary to agitate the tin bichlorid to get the process to work efficiently, both in order to control the temperature and on account of the fact that the surface of the submerged tin becomes coated with any impurities that may be present in the tin and thus the action of the chlorin on the tin is retarded. By agitating the mass, the metallic surface is kept clean and the action proceeds uniformly.

From the foregoing, it will be seen that in carrying out my process, it is not necessary to dry the chlorin gas, and it will also be seen that the process is a continuous one. When the chlorin is admitted to the tin bichlorid, or other anhydrous liquid, it attacks the tin contained therein and sealed thereby and forms additional tin bichlorid. The latter is perfectly free from moisture, notwithstanding the fact that moist chlorin gas may be used, and may be drawn off from time to time, without interfering with the continuity of the process.

In operating my process of making anhydrous tin bichlorid, I employ an apparatus shown in the accompanying drawing.

"A" is the reaction kettle and is provided with a water jacket controlling the temperature of its contents.

"*a a*" are paddles for agitating the contents of the kettle, "*c*" the chlorin inlet, "*b*" the automatic feed for introducing the tin, "D" a settling tank, "C" a wash-tower for escaping gases, "G", "E" and "F" are stills, provided with condenser "H"; "I" is the receiving tank for the anhydrous tin bichlorid.

In operation, the reaction kettle "A" is filled to the level of the outlet "*e*" with anhydrous tin bichlorid and a quantity of finely divided metallic tin introduced through the feed "*b*". The whole is agitated by the paddles "*a a*". The chlorin gas is introduced through the inlet "*c*". The supply of metallic tin in the kettle "A" is maintained by feeding in tin continuously through "*b*". The unabsorbed gases nitrogen, oxygen and traces of chlorin pass out at "d" through the return condenser "B" and then through the wash-tower "C". The volume of anhydrous tin bichlorid in "A" being continually increased by the combination of the chlorin gas and the metallic tin over-flows through the outlet "e" into the settling tank "D" from which it flows through "f" into the kettles "E" and "F" where it distilled, passing through the condenser "H" into the receiving tank "I". When sufficient impurities have accumulated in "D" and "A" to form a sludge, the cocks "g" and "h" are opened whence it runs into the still "G", the anhydrous tin bichlorid in the sludge is separated from the impurities by distilling it from "G" through "H" into "I". The still "G" is provided with an agitator kept in motion during distillation and a cock "i" through which the impurities are removed. The pipe "K" leading from stills "E", "F" and "G" to the wash-tower, is supplied with cocks so that when these kettles are being filled with tin bichlorid, the escaping gases pass through the wash-tower. "L" serves a similar purpose for "I".

What I claim is:—

1. The continuous process of making anhydrous tin bichlorid, which consists in submerging metallic tin beneath the surface of liquid anhydrous stannic chlorid, and afterward applying moist chlorin gas thereto.

2. The continuous process of making anhydrous tin bichlorid, which consists in submerging metallic tin beneath the surface of liquid anhydrous stannic chlorid, and afterward continuously introducing moist chlorin gas beneath the surface of the liquid and simultaneously agitating the substances under treatment.

In witness whereof, I subscribe my signature, in the presence of two witnesses.

GERVAIS BAILLIO.

Witnesses:
 H. H. HACKENHEIMER,
 S. N. LEE.